(12) United States Patent
Shan et al.

(10) Patent No.: US 10,986,930 B2
(45) Date of Patent: Apr. 27, 2021

(54) FRAME STRUCTURE OF AN ELECTRIC BED

(71) Applicant: Keeson Technology Corporation Limited, Zhejiang (CN)

(72) Inventors: Huafeng Shan, Zhejiang (CN); Yanling Li, Zhejiang (CN)

(73) Assignee: Keeson Technology Corporation Limited, Jiaxing (CN)

( * ) Notice: Subject to any disclaimer, the term of this patent is extended or adjusted under 35 U.S.C. 154(b) by 255 days.

(21) Appl. No.: 16/138,991

(22) Filed: Sep. 22, 2018

(65) Prior Publication Data
US 2019/0021507 A1    Jan. 24, 2019

Related U.S. Application Data

(63) Continuation of application No. PCT/CN2017/116270, filed on Dec. 14, 2017.

(30) Foreign Application Priority Data

Mar. 3, 2017  (CN) .......................... 201710123962.X

(51) Int. Cl.
*A47C 19/00* (2006.01)
*A47C 20/04* (2006.01)
(Continued)

(52) U.S. Cl.
CPC ............ *A47C 19/005* (2013.01); *A47C 19/00* (2013.01); *A47C 19/02* (2013.01); *A47C 20/041* (2013.01);
(Continued)

(58) Field of Classification Search
CPC ....... A47C 19/005; A47C 19/02; A47C 19/00; A47C 20/041; F16B 12/10; F16B 12/54; F16B 2012/106
See application file for complete search history.

(56) References Cited

U.S. PATENT DOCUMENTS

| 7,690,058 | B1* | 4/2010 | Dwyer | A47C 19/005 5/310 |
| 2010/0229303 | A1* | 9/2010 | Goldsmith | A47C 19/005 5/285 |
| 2014/0352068 | A1* | 12/2014 | Xu | A61G 7/015 5/616 |

FOREIGN PATENT DOCUMENTS

| CN | 102512016 A | 6/2012 |
| CN | 203262741 U | 11/2013 |

(Continued)

OTHER PUBLICATIONS

International Search Report of PCT Patent Application No. PCT/CN2017/116270 dated Mar. 1, 2018.
(Continued)

*Primary Examiner* — Eric J Kurilla
*Assistant Examiner* — James T Coble

(57) ABSTRACT

A frame structure of an electric bed includes a detachable upper frame and a detachable lower frame, wherein the upper frame includes wheels, and the lower frame includes rail slots. The lower frame can be separated into a front lower frame and a rear lower frame; the front lower frame includes a front lower frame main body and front lower frame mounting portions on both sides of the front lower frame main body; the rear lower frame includes a rear lower frame main body and rear lower frame mounting portions on both sides of the rear lower frame main body; and wherein the front lower frame mounting portions and the rear lower frame mounting portions are connected by screws; and the front lower frame main body and the rear lower frame main body together form an accommodating space for accommodating a driving structure of an electric bed.

6 Claims, 2 Drawing Sheets

(51) Int. Cl.
 *F16B 12/10* (2006.01)
 *F16B 12/54* (2006.01)
 *A47C 19/02* (2006.01)

(52) U.S. Cl.
 CPC .............. *F16B 12/10* (2013.01); *F16B 12/54* (2013.01); *F16B 2012/106* (2013.01)

(56) References Cited

FOREIGN PATENT DOCUMENTS

| CN | 203328322 U | 12/2013 |
| CN | 204838744 U | 12/2015 |
| CN | 205054770 U | 3/2016 |
| JP | 2006136554 A | 6/2006 |

OTHER PUBLICATIONS

The First Written Opinion of counterpart Singaporean Patent Application No. 11201808876Q dated Apr. 25, 2020.

* cited by examiner

FRAME STRUCTURE OF AN ELECTRIC BED

CROSS-REFERENCE OF RELATED APPLICATIONS

The present application is a Continuation Application of PCT patent application no. PCT/CN2017/116270 filed on Dec. 14, 2017, which claims the priority of Chinese patent application no. 201710123962.X filed on Mar. 3, 2017. All the above are hereby incorporated by reference.

FIELD OF TECHNOLOGY

The present application relates to a frame structure of an electric bed, in particular to a detachable frame structure of an electric bed.

BACKGROUND TECHNOLOGY

With the improvement of people's living standards, electric beds are widely used.

The existing electric bed is usually of an integrated design, that is, a large bed frame fixedly mounted with a plurality of mechanical and electrical components connected by wires and cables, and detachable bed legs further mounted on the bed frame.

This type of integrated electric bed is not only complicated in construction, but also large in size and heavy in weight. This causes inconvenience in packaging and transportation, increasing the difficulty of moving to the household. Due to the limitation of residential elevators and stairs, the integrated electric bed is difficult to move, which greatly increases the labor intensity of transportation. Some electric beds cannot even be moved to the household, which makes the application of electric beds very limited.

For the above reason, a detachable frame structure of an electric bed is needed for easy transportation.

SUMMARY

It is to be noted that the purpose of the present application is to overcome one or more of the disadvantages that have been found in the prior art.

For this purpose, a frame structure of an electric bed is proposed according to the present application, which is realized by the following technical solutions:

A frame structure of an electric bed includes a detachable upper frame and a detachable lower frame, wherein the upper frame includes wheels, and the lower frame includes rail slots, so that the upper frame is capable to move relative to the lower frame;
wherein the lower frame is capable to be separated into a front lower frame and a rear lower frame;
the front lower frame includes a front lower frame main body and front lower frame mounting portions on both sides of the front lower frame main body;
the rear lower frame includes a rear lower frame main body and rear lower frame mounting portions on both sides of the rear lower frame main body; and
wherein the front lower frame mounting portions of the front lower frame and the rear lower frame mounting portions of the rear lower frame are connected by screws; and the front lower frame main body of the front lower frame and the rear lower frame main body of the rear lower frame together form an accommodating space for accommodating a driving structure of the electric bed.

Because of these configurations, the detachable upper frame, the detachable lower frame, and the front lower frame and the rear lower frame that can be split again are obtained, which is more convenient for independent packaging transportation and simple to install. Furthermore, since the front lower frame main body of the front lower frame and the rear lower frame main body of the rear lower frame together form an accommodating space for accommodating the driving structure of the electric bed, the internal structure of the electric bed after installation is more compact.

In various embodiments of the title according to the present application, we may rely on one and/or more of the following configurations:

Further, the frame structure of an electric bed further includes connecting members, and each connecting member surrounds an outer side of one of the front lower frame mounting portions of the front lower frame and an outer side of one of the rear lower frame mounting portions of the rear lower frame, and is fixed as a whole by a screw passing through the foregoing three, so that the electric bed does not deform during the movement.

Further, the screw passes through the connecting member, the one of the front lower frame mounting portions of the front lower frame, and the one of the rear lower frame mounting portions of the rear lower frame along a length direction of the electric bed, so that the electric bed does not deform during the movement.

Further, the frame structure of an electric bed further includes bed leg assemblies that are fixed to the connecting members along a vertical direction perpendicular to the length direction and a width direction of the electric bed.

Further, the upper frame includes a detachable front upper frame and a detachable rear upper frame, wherein the front upper frame includes a front upper frame main body and front upper frame mounting portions; the rear upper frame includes a rear upper frame main body and a rear upper frame mounting portion; and the front upper frame mounting portions of the front upper frame and the rear upper frame mounting portions of the rear upper frame are connected by screws or rivets, so that the electric bed does not deform during the movement.

Further, the frame structure of an electric bed further includes a reinforcing member disposed on an outer side of a joint of one of the front upper frame mounting portions of the front upper frame and one of the rear upper frame mounting portions of the rear upper frame, and is fixed as a whole by screws, so that the electric bed does not deform during the movement and is more robust.

The frame structure of an electric bed of the present application facilitates installation and transportation of a large-sized electric bed, and its main advantages are quick installation, tool-free installation, and a variety of optional accessories to improve assembly robustness.

BRIEF DESCRIPTION OF THE DRAWINGS

It should be understood that in the present application, all features, modifications, and/or embodiments may be combined in various combinations, except in the cases of obvious contradictions and incompatibilities.

By reading the following non-limiting illustrative embodiments, and in conjunction with the drawings, other features and advantages of the present application will become apparent. In the figures.

DETAILED DESCRIPTION

Figure 1:
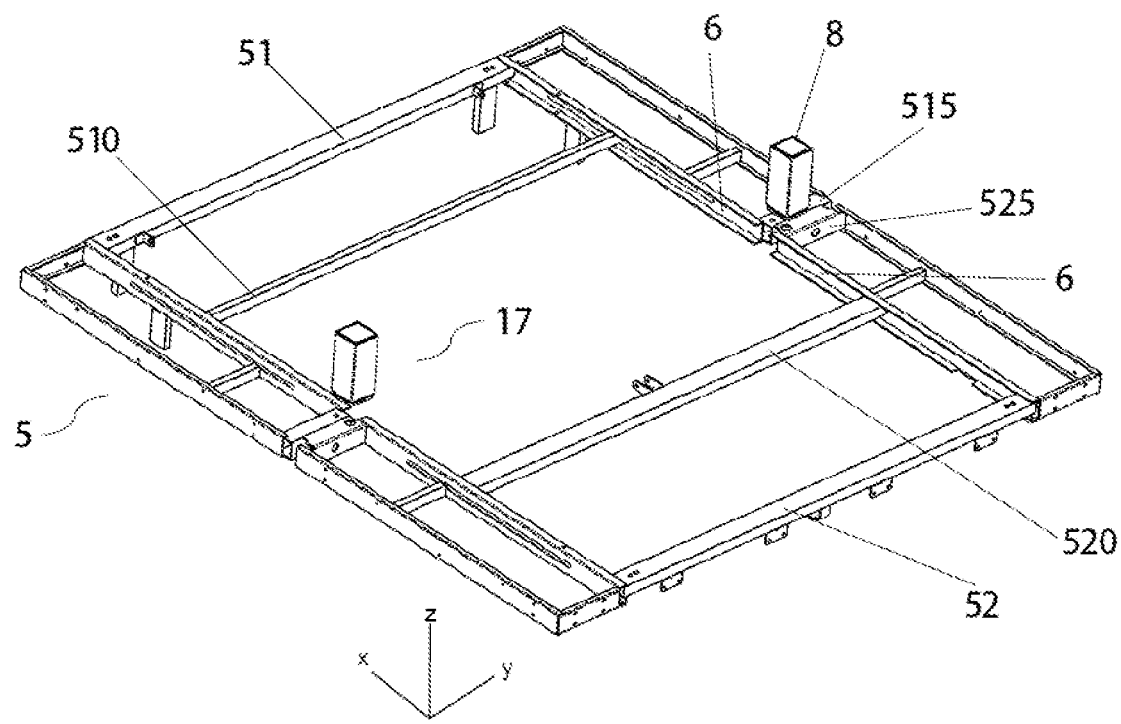
FIG. 1 is an assembled view showing a lower frame of a frame structure of an electric bed according to an embodiment of the present application.

It should be understood that the abovementioned drawings are not drawn to actual scale, but are merely schematic representations of various preferred features for illustrating the basic principles of the present application. The design features disclosed in the present application, such as size, orientation, position, and shape, are determined based on specific applications and use environments.

The present application will be described in detail below with reference to the embodiments and the accompanying drawings. In these figures, the same reference numerals are used to refer to the same or equivalent elements of the present application in the drawings.

Figure 2:
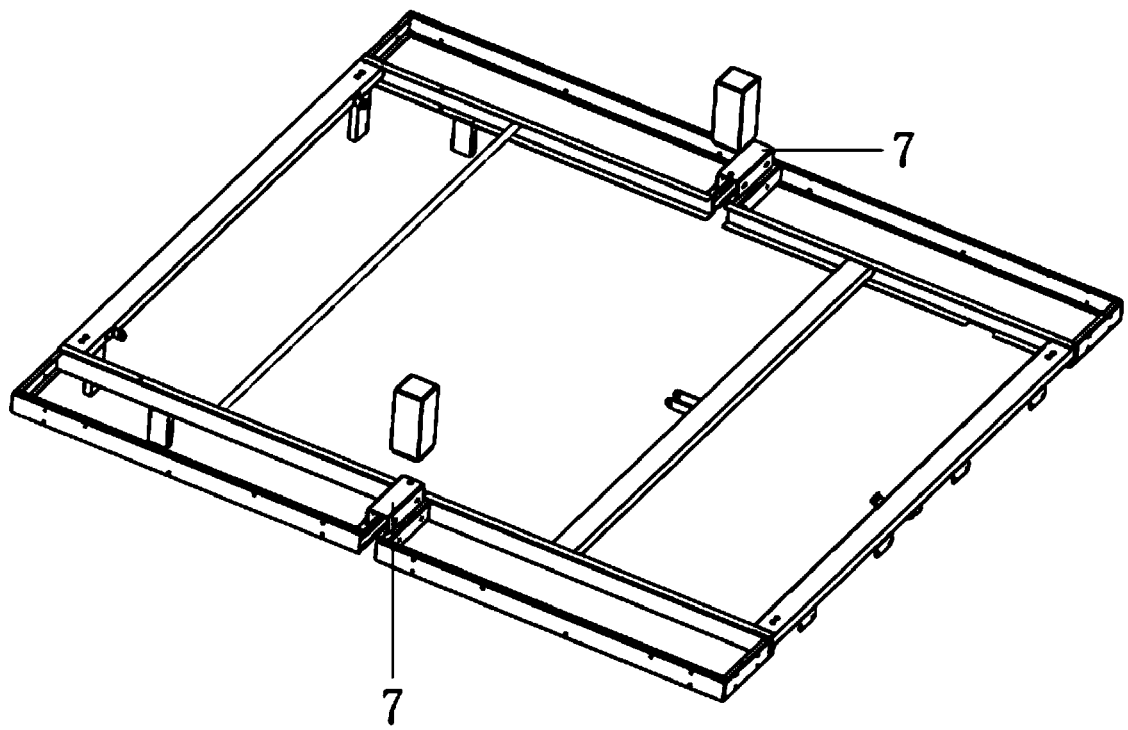
FIG. 2 is an assembled view showing a lower frame of a frame structure of an electric bed according to another embodiment of the present application.
Figure 3:
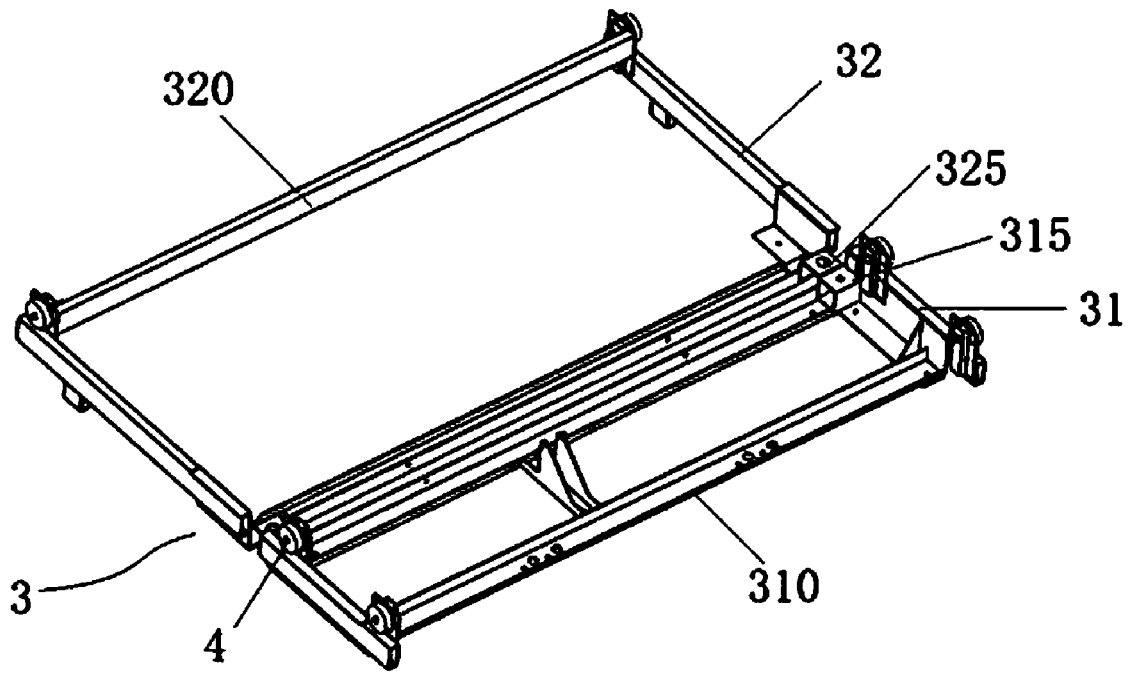
FIG. 3 is an assembled view showing an upper frame of a frame structure of an electric bed according to an embodiment of the present application.
Figure 4:
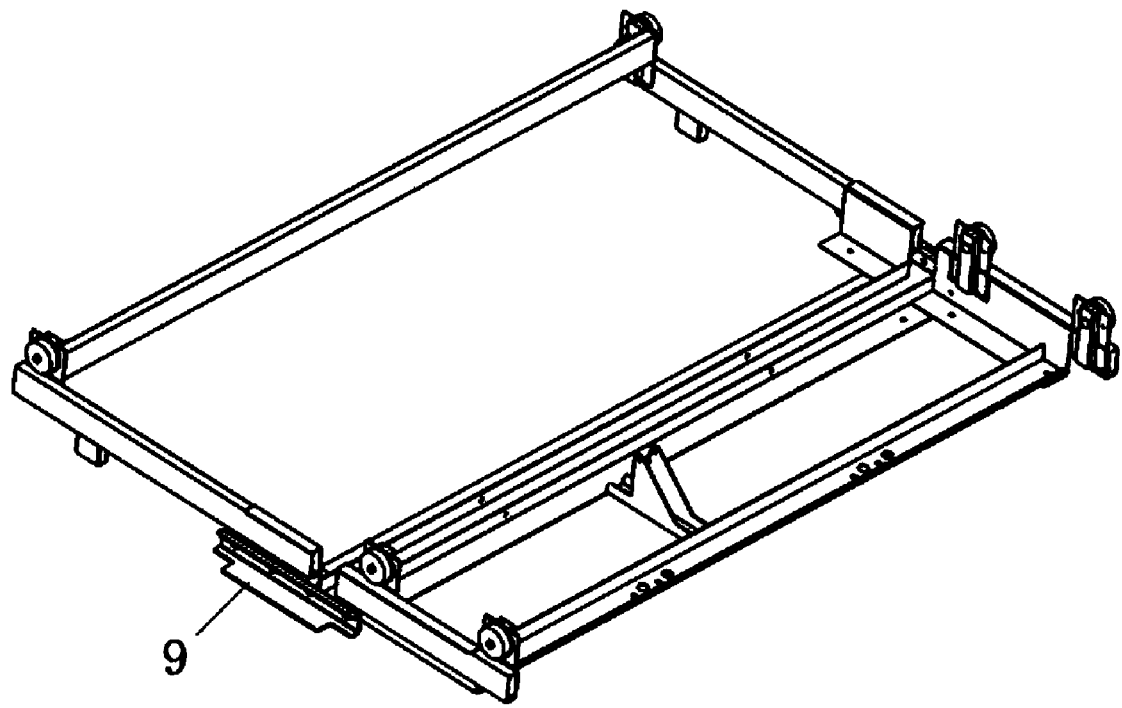
FIG. 4 is an assembled view showing an upper frame of a frame structure of an electric bed according to another embodiment of the present application.

A frame structure of an electric bed of the present application can be combined by any of the lower frames as shown in FIGS. 1 to 2 and any of the upper frames as shown in FIGS. 3 to 4.

The frame structure of an electric bed of the present application can be applied to any type of electric beds, especially relatively large electric beds, such as electric double beds.

The frame structure of an electric bed of the present application includes a detachable upper frame 3 and a detachable lower frame 5, wherein the upper frame 3 includes wheels 4, and the lower frame 5 includes rail slots 6, so that the upper frame 3 is capable to move relative to the lower frame 5.

The lower frame 5 as shown in FIGS. 1 and 2 can be separated into a front lower frame 51 and a rear lower frame 52.

The front lower frame 51 includes a front lower frame main body 510 and front lower frame mounting portions 515 on both sides of the front lower frame main body 510. The front lower frame main body 510 includes a first crossbar and a second crossbar disposed between the two front lower frame mounting portions 515. The first crossbar and the second crossbar are directly connected to the rail slots 6.

The rear lower frame 52 includes a rear lower frame main body 520 and rear lower frame mounting portions 525 on both sides of the rear lower frame main body 520. The rear lower frame main body 520 includes a third crossbar and a fourth crossbar disposed between the two rear lower frame mounting portions 525. The third crossbar and the fourth crossbar are directly connected to the rail slots 6.

Specifically, the front lower frame mounting portions 515 of the front lower frame 51 and the rear lower frame mounting portions 525 of the rear lower frame 52 are connected by screws. The screws are connected to the front lower frame mounting portions 515 of the front lower frame 51 and the rear lower frame mounting portions 525 of the rear lower frame 52 along the length direction of the electric bed. And the front lower frame main body 510 of the front lower frame 51 and the rear lower frame main body 520 of the rear lower frame 52 together form an accommodating space 17 for accommodating a driving structure of an electric bed.

The accommodating space 17 can be provided with a driving mechanism and a driver (not shown) that drive bed planks of the electric bed to rotate.

As shown in FIG. 2, another improved lower frame is shown. As compared with the lower frame of the previous embodiment, the improved lower frame further includes connecting members 7. Each of the connecting members 7 surrounds an outer side of one of the front lower frame mounting portions 515 of the front lower frame 51 and an outer side of one of the rear lower frame mounting portions 525 of the rear lower frame 52, and is fixed as a whole by a screw passing through the foregoing three.

Specifically, the screw passes through the connecting member 7, one of the front lower frame mounting portions 515 of the front lower frame 51, and one of the rear lower frame mounting portions 525 of the rear lower frame 52 along a length direction X of the electric bed.

Specifically, the lower frame further includes bed leg assemblies 8 that are fixed to the connecting members 7 along a vertical direction Z perpendicular to the length direction X and a width direction Y of the electric bed.

The upper frame 3 as shown in FIGS. 3 and 4 can be separated into a front upper frame 31 and a rear upper frame 32.

The front upper frame 31 includes a front upper frame main body 310 and front upper frame mounting portions 315. The rear upper frame 32 includes a rear upper frame main body 320 and rear upper frame mounting portions 325. The front upper frame mounting portions 315 of the front upper frame 31 and the rear upper frame mounting portions 325 of the rear upper frame 32 are connected by screws or rivets.

As shown in FIG. 4, another improved upper frame is shown. As compared with the upper frame of the previous embodiment, the improved upper frame further includes a reinforcing member 9 disposed on an outer side of a joint of one of the front upper frame mounting portions 315 of the front upper frame 31 and one of the rear upper frame mounting portions 325 of the rear upper frame 32, and is fixed as a whole by screws.

The above embodiments are merely examples and do not limit the scope of the present application. Based on this, those skilled in the art can envision other embodiments that can achieve the same function within the scope of the claims of the present application.

Various embodiments and various modifications and improvements will be apparent to those skilled in the art. In particular, it should be understood that the above-described features, modifications, and/or embodiments of the present application may be combined with each other, except in the case of obvious contradictions or incompatibilities. All of these embodiments, as well as variations and modifications, are within the scope of the present application.

What is claimed is:

1. A frame structure of an electric bed, comprising a detachable upper frame (3) and a detachable lower frame (5),
   wherein the upper frame (3) comprises wheels (4), and the lower frame (5) comprises rail slots (6), so that the upper frame (3) is capable to move relative to the lower frame (5);
   wherein the lower frame (5) is capable to be separated into a front lower frame (51) and a rear lower frame (52);
   the front lower frame (51) comprises a front lower frame main body (510) and front lower frame mounting portions (515) on both sides of the front lower frame main body (510);

the rear lower frame (52) comprises a rear lower frame main body (520) and rear lower frame mounting portions (525) on both sides of the rear lower frame main body (520); and wherein the front lower frame mounting portions (515) of the front lower frame (51) and the rear lower frame mounting portions (525) of the rear lower frame (52) are connected by screws; and the front lower frame main body (510) of the front lower frame (51) and the rear lower frame main body (520) of the rear lower frame (52) together form an accommodating space (17) for accommodating a driving structure of the electric bed;

wherein the front lower frame main body (510) comprises a first crossbar and a second crossbar disposed between the front lower frame mounting portions (515), and the first crossbar and the second crossbar are directly connected to the rail slots (6); and the rear lower frame main body (520) comprises a third crossbar and a fourth crossbar disposed between the rear lower frame mounting portions (525), and the third crossbar and the fourth crossbar are directly connected to the rail slots (6).

2. The frame structure of the electric bed according to claim 1, further comprising: connecting members (7), and each connecting member (7) surrounds an outer side of one of the front lower frame mounting portions (515) of the front lower frame (51) and an outer side of one of the rear lower frame mounting portions (525) of the rear lower frame (52), and is fixed as a whole by a screw passing through the foregoing three.

3. The frame structure of the electric bed according to claim 2, wherein the screw passes through the connecting member (7), the one of the front lower frame mounting portions (515) of the front lower frame (51), and the one of the rear lower frame mounting portions (525) of the rear lower frame (52) along a length direction (X) of the electric bed.

4. The frame structure of the electric bed according to claim 2, further comprising: bed leg assemblies (8) that are fixed to the connecting members (7) along a vertical direction (Z) perpendicular to the length direction (X) and a width direction (Y) of the electric bed.

5. The frame structure of the electric bed according to claim 1, wherein the upper frame (3) comprises a detachable front upper frame (31) and a detachable rear upper frame (32), wherein the front upper frame (31) comprises a front upper frame main body (310) and front upper frame mounting portions (315); the rear upper frame (32) comprises a rear upper frame main body (320) and rear upper frame mounting portions (325); and the front upper frame mounting portions (315) of the front upper frame (31) and the rear upper frame mounting portions (325) of the rear upper frame (32) are connected by screws or rivets.

6. The frame structure of the electric bed according to claim 5, further comprising: a reinforcing member (9) disposed on an outer side of a joint of one of the front upper frame mounting portions (315) of the front upper frame (31) and one of the rear upper frame mounting portions (325) of the rear upper frame (32), and is fixed as a whole by screws.

\* \* \* \* \*